United States Patent
Boecker et al.

(10) Patent No.: US 8,491,833 B2
(45) Date of Patent: Jul. 23, 2013

(54) RECEPTACLE WITH INTEGRALLY MOLDED ELONGATED ELEMENTS

(75) Inventors: Albert J. Boecker, Ettlingen (DE); Andreas W. Dobmaier, Karlsruhe (DE); Alex Ehler, Restatt (DE); Peter Grauer, Steinweiler (DE); Matthias B. Olbrich, Trimbach (FR)

(73) Assignee: TI Automotive Technology Center GmbH, Rastatt (DE)

( * ) Notice: Subject to any disclaimer, the term of this patent is extended or adjusted under 35 U.S.C. 154(b) by 0 days.

(21) Appl. No.: 13/163,211

(22) Filed: Jun. 17, 2011

(65) Prior Publication Data
US 2012/0321823 A1 Dec. 20, 2012

(51) Int. Cl.
*B29C 49/20* (2006.01)

(52) U.S. Cl.
USPC .............................. 264/516; 264/523; 264/572

(58) Field of Classification Search
None
See application file for complete search history.

(56) References Cited

U.S. PATENT DOCUMENTS 6,712,234 B2 * 3/2004 Boecker .................... 220/563
2009/0045542 A1 * 2/2009 Borchert et al. ........ 264/171.12

* cited by examiner

*Primary Examiner* — Monica Huson
(74) *Attorney, Agent, or Firm* — Reising Ethington P.C.

(57) ABSTRACT

A method of forming a fuel tank may include providing a cavity for forming fuel tanks; inserting one or more elongated elements within the cavity; placing a parison in the cavity proximate to the elongated elements; and exerting fluid pressure on the parison thereby deforming the parison and engaging the elongated elements with a surface of the parison.

15 Claims, 5 Drawing Sheets

RECEPTACLE WITH INTEGRALLY MOLDED ELONGATED ELEMENTS

TECHNICAL FIELD

The present disclosure relates generally to fluid receptacles, such as fuel tanks.

BACKGROUND

Fuel tanks for automotive vehicles have been made from metal and plastic materials. Fuel tanks are formed in various sizes and shapes as required for the various applications in which they are used. Fuel tanks used in passenger vehicles must meet certain requirements relating to, for example, resistance to rupture upon impact and permeability to hydrocarbons in fuel vapor. Typical plastic fuel tanks include a single wall of material and that wall may be formed from a single material or multiple layers of different materials.

SUMMARY

A method of forming a fuel tank may include providing a cavity for forming fuel tanks; inserting one or more elongated elements within the cavity; placing a parison in the cavity; and exerting fluid pressure on the parison thereby deforming the parison and engaging the elongated elements with a surface of the parison.

A method of forming a fuel tank may include providing a mold having a first section and a second section that collectively define a cavity between them; providing a source for delivering an elongated element adjacent the mold; inserting the elongated element into the cavity of the mold; securing the elongated element in the cavity of the mold; inserting a parison having an inner and an outer surface into the cavity of the mold; and exerting pressure on the inner surface of the parison to force the outer surface of the parison against the elongated element so as to engage at least a portion of the elongated element with the outer surface of the parison and shape a portion of the parison.

A system for forming a fuel tank can include a mold having at least one cavity that forms a surface against which a fuel tank is molded from a molten parison and one or more locations for securing an elongated element during the molding of the fuel tank; a source of the elongated element capable of inserting the elongated element into the cavity between the mold and an outer surface of the parison; and a source of fluid pressure that forces the outer surface of the parison toward the surface of the mold and into the elongated element.

A fluid receptacle includes an outer wall defining a periphery of the fluid receptacle and one or more elongated features that are at least partially embedded within the outer wall of the fluid receptacle.

BRIEF DESCRIPTION OF THE DRAWINGS

The following detailed description of exemplary embodiments and best mode will be set forth with reference to the accompanying drawings, in which.

DETAILED DESCRIPTION OF PRESENTLY PREFERRED EMBODIMENTS

Receptacles, such as but not limited to fuel tanks, may be molded from plastic or other similar material. Receptacles may contain a liquid, and in the case of fuel tanks the liquid is fuel that may be delivered to an engine to support operation of the engine.

As disclosed herein, during the process of blow molding fuel tanks one or more elongated features may be at least partially embedded in a surface of the fuel tank. The elongated features can form structural or stiffening ribs in the fuel tank as well as provide additional support. In one implementation, the elongated features can be placed between the shaping surface of one or more blow mold dies or sections and the outside surface of a molten parison. When the parison is forced outwards under pressure toward the surface of the blow mold die, the elongated features that have been placed in between the mold and the molten parison become partially or fully embedded in the parison. The elongated features can also prevent a portion of the molten parison from contacting the surface of the blow forming mold resulting in the formation of one or more ribs in the fuel tank. When the formed parison (e.g. fuel tank) cools, the elongated features become integrated to the walls of the formed fuel tank. This can facilitate a reduction in fuel tank wall thickness thereby reducing the amount of material used to construct the tank. In addition, the elongated features and any ribs formed thereby can also act to increase the rigidity of the tank and stiffen the fuel tank. The integration of the elongated features into the wall of the fuel tank can be used instead of or in addition to other non-integrated attachment methods, such as straps (metal or otherwise) or attachment flanges formed from the flashing, and by which the fuel tank can be mounted to a vehicle.

The elongated features can take any one of a number of possible forms. For instance, it is possible that the elongated feature can be implemented using wire of various compositions and/or cross-sectional shapes and sizes. Other examples include cables, thread, filament, or any other such material. While the cross-section of these can clearly be circular in shape, other cross-sectional shapes are possible, such as oval, square, and rectangle to name a few. It is also possible that the elongated features can be a band, belt, chain, or rope having a rectangular cross-section. In short, the cross-sectional shape and construction of the elongated feature is not essential to the system and/or method disclosed herein. For purposes of explanation, the elongated feature(s) may alternatively be referred to as wire or wire portions. However, this nomenclature should not be interpreted as limiting the variety of materials or structures that can possibly be used to implement the elongated features.

Figure 1A:
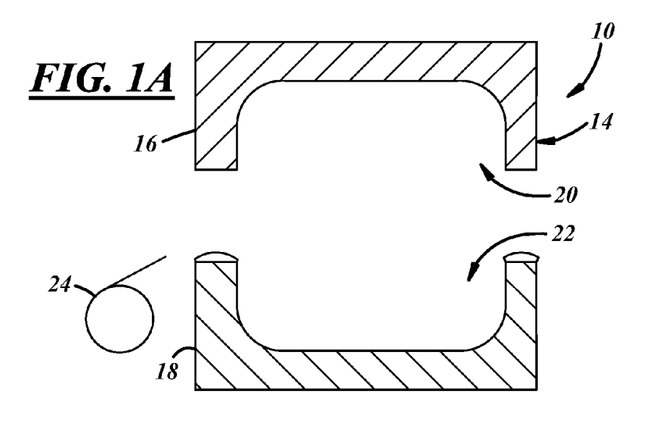
FIGS. 1(a)-1(f) are cross-sectional profile views of a system for forming a fuel tank.

Referring in more detail to the drawings, FIGS. 1(a)-1(f) depict cross-sections of a blow molding apparatus 10 that may be used to form a receptacle, such as a fuel tank, from a molten parison 12. As is shown in FIG. 1(a), the blow molding apparatus 10 can include a mold 14 having a first section 16 and a second section 18 which when closed together can be used to shape the external surface of the fuel tank during the molding process. The first section 16 can include a first cavity 20 and the second section 18 can include a second cavity 22 that when the first and second sections 16, 18 are positioned opposite each other so that the first and second cavities 20, 22 face each other, the first and second cavities 20, 22 collectively define a forming surface that defines the shape of the outer surface of the fuel tank.

In addition, a source of wire 24 can be located adjacent to the mold 14 for providing wire into the mold 14 across the first cavity 20 and/or second cavity 22 for ultimately incorporating at least some portion of wire into the exterior surface of the fuel tank. To hold the wire sections, a first holding feature 26 and a second holding feature 28 can be located on opposite sides of second section 18. The first and second holding features 26, 28 can releasably secure wire portions between the holding features 26, 28 so that wire portions are at least partially disposed within the second cavity 22.

Figure 1B:
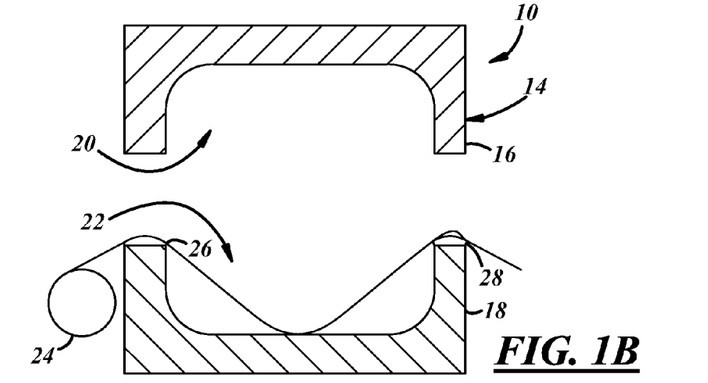

FIG. 1(b) shows the mold 14 with a portion of wire 30 inserted across the second cavity 22. The portion of wire 30 can be attached to the second section 18 at the first holding feature 26 and/or the second holding feature 28. In this case, the length of the portion of wire 30 can be less than an amount that would allow it to rest flush with the surface of the second cavity 22. The length of the portion of wire 30 can prevent the outer surface of the parison 12 from contacting the surface of the second cavity 22. As a result, the portion of wire 30 secured at the first and second holding features 26, 28 can act to at least partially form the molten parison 12 thereby creating a rib in the formed fuel tank.

Figure 1C:
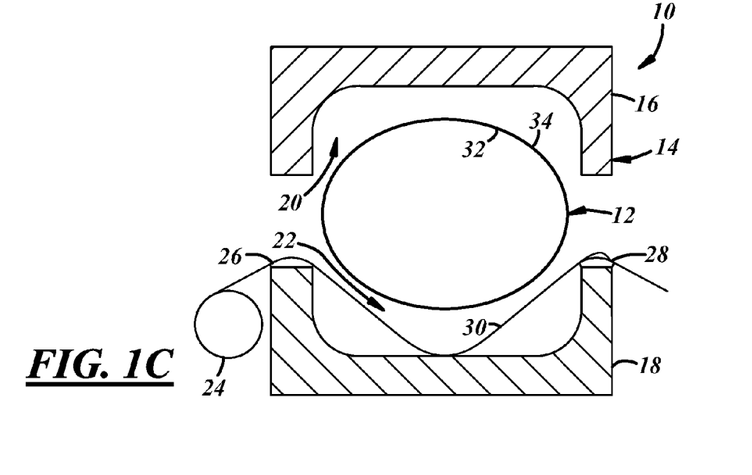

FIG. 1(c) shows the parison 12 inserted above the portion of wire 30 and in between the first cavity 20 and the second cavity 22. The parison 12 can have an inner surface 32 and an outer surface 34. During the blow molding process, fluid pressure is exerted against the inner surface 32 of parison 12 thereby moving the outer surface 34 of the parison 12 into contact with the surface of the first cavity 20 and the second cavity 22, as well as the portion of wire 30.

Figure 1D:
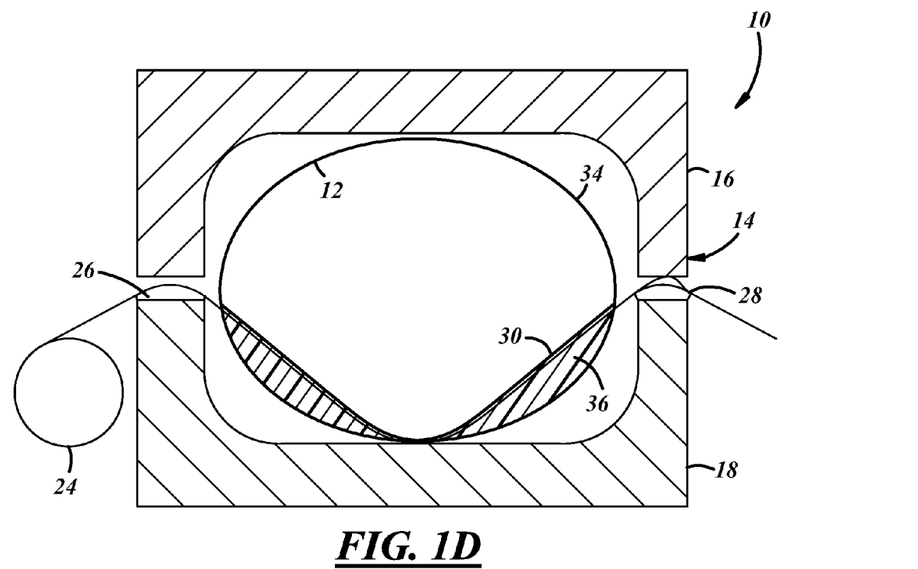

With respect to FIG. 1(d), the first section 16 and the second section 18 of the mold 14 can be brought together and joined around the parison 12 and the portion of wire 30 in preparation for forming the fuel tank. Here, the outer surface 34 of parison 12 can be forced against the portion of wire 30 in the process at least partially creating a rib in the parison 12. The outer surface 34 of the parison 12 can be deflected along the portion of the wire 30, which may be tensioned using the first and second holding features 26, 28. The deflections in the parison 12 can be appreciated from the shaded areas 36. It is possible to create the deflections before pressure is exerted on the parison 12.

Figure 1E:
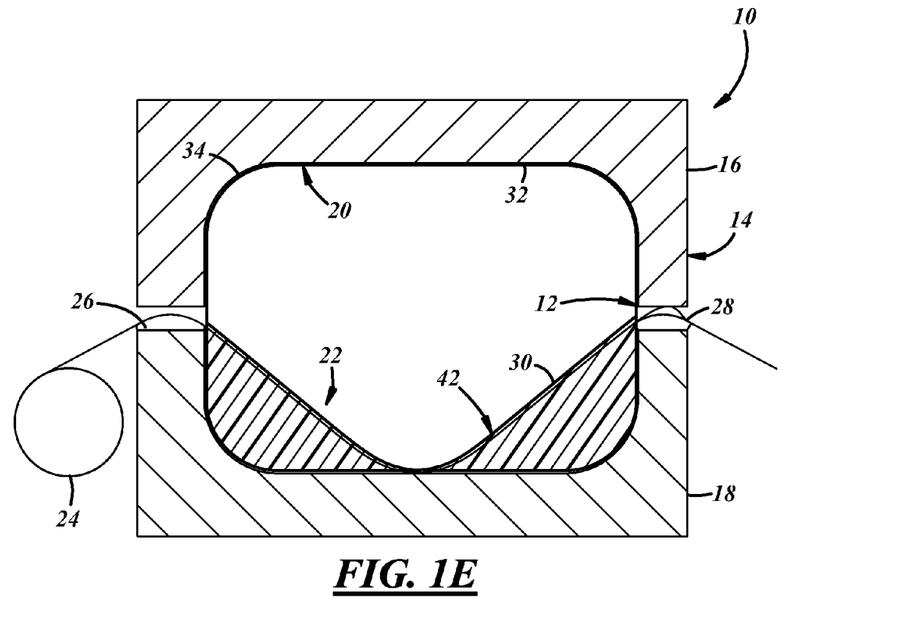

In FIG. 1(e), fluid pressure is exerted on the inner surface 32 of the parison 12 thereby forcing the outer surface 34 of the parison 12 into conformity with the first cavity 20 and second cavity 22 as well as the portion of wire 30. As can be appreciated from FIG. 1(e), the outer surface 34 of the parison can be formed against the surface of the first cavity 20 in the absence of the portion of wire 30. However, the portion of wire 30 prevents the outer surface 34 of the parison 12 from fully contacting the surface of the second cavity 22 and in the process forms a rib 42 in the fuel tank.

Figure 1F:
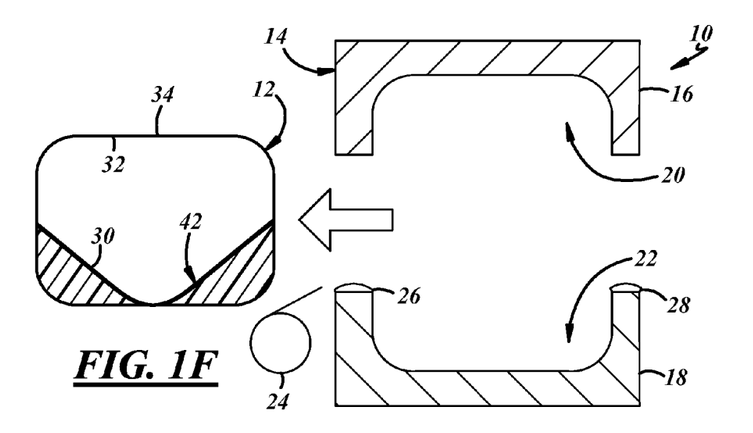

Turning to FIG. 1(f), the first section 16 and the section 18 can be separated to remove the parison 12 (e.g. the formed fuel tank) from the mold. The wire 30 can be cut at this time or earlier, such as when the mold sections 16, 18 are closed together.

Figure 2:
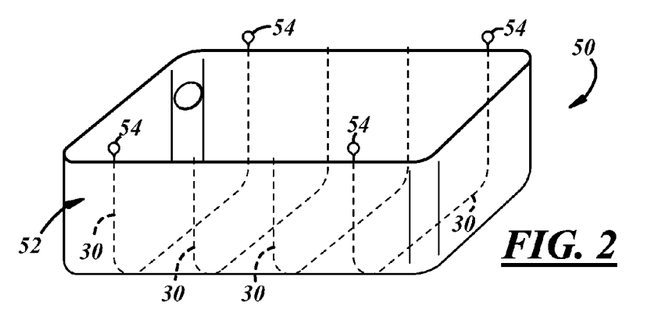
FIG. 2 is a perspective view of a fuel tank including a plurality of elongated features.

With respect to FIG. 2, a fuel tank 50 is shown having a plurality of wire sections 30 incorporated into the outer surface 52 of the fuel tank 50. After the parison 12 described with respect to FIGS. 1(a)-1(f) has been removed from the first and second mold sections 16, 18, and cooled, the result is the fuel tank 50. The outer surface 52 of the fuel tank 50 shown in FIG. 2 includes a plurality of wire portions 30 that were molded into the tank 50 during the blow molding process. It is possible that one or more of the wire portions 30 can be formed into one or more fuel tank mounting points 54. For instance, the fuel tank mounting point 54 can be created by forming a loop with the end of one or more wire portions 30, or by attaching the wire sections to a bracket or other mounting feature or component.

Figure 3A:
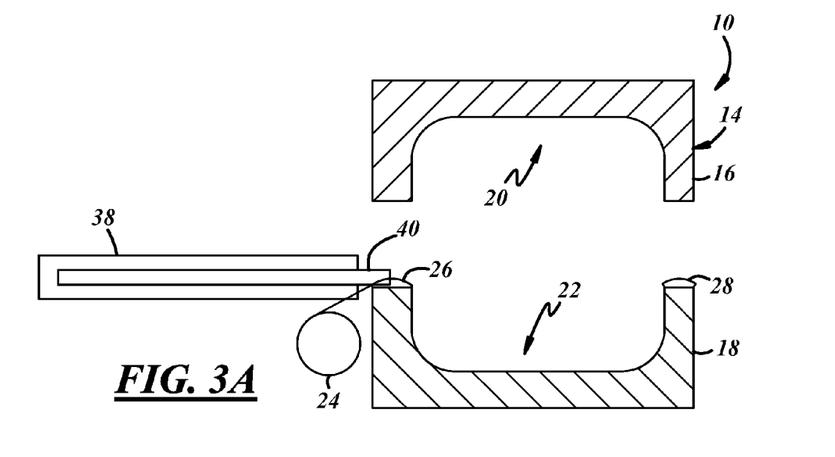
FIGS. 3(a)-3(c) are additional cross-sectional profile views of a system for forming a fuel tank.
Figure 3B:
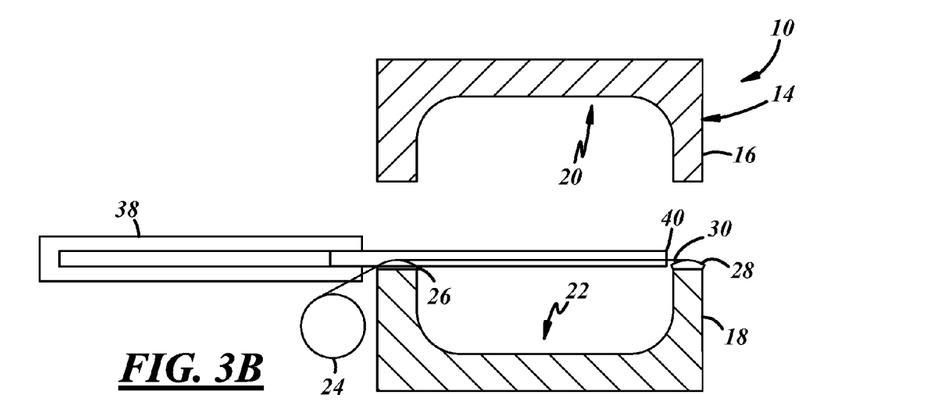
Figures 3C, 4:
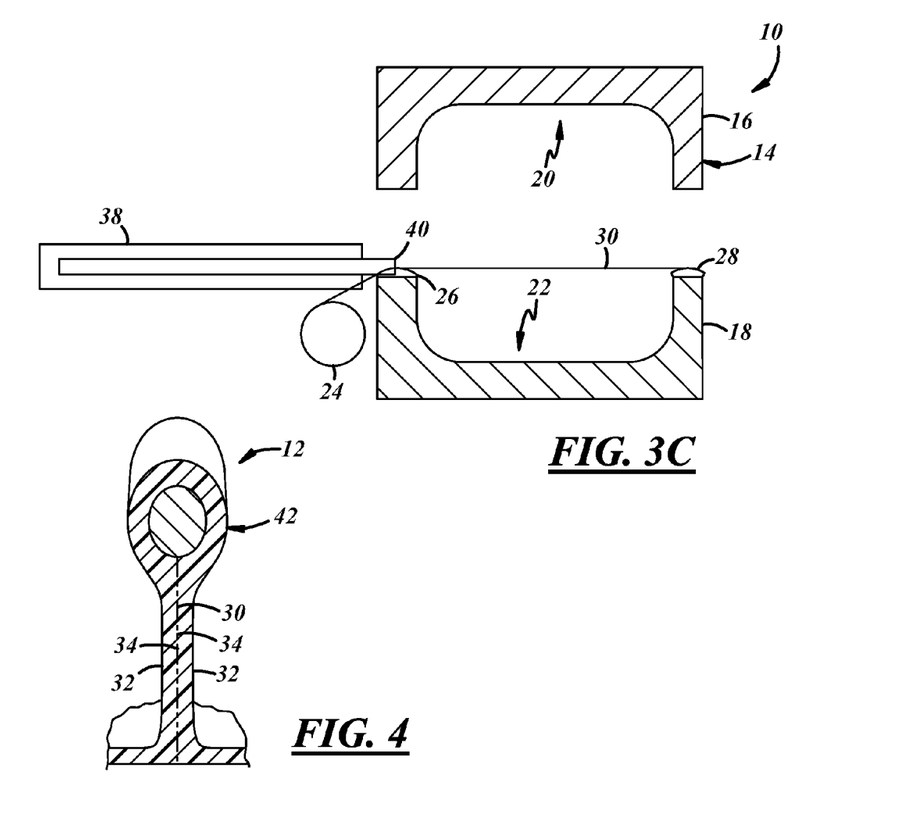
FIG. 4 is a cross-section of a parison incorporating a section of wire.

With respect to FIGS. 3(a)-3(c), one implementation of a wire placement device is shown adjacent the mold 14. The wire placement device is shown as a pneumatic device 38 having a movable piston 40. The piston 40 shown in FIG. 3(a) is in a retracted position and at this time the piston 40 can use a gripping feature to releasably grip wire from the wire source 24. FIG. 3(b), depicts the movable piston 40 deployed or extended from the pneumatic device 38 thereby carrying the wire section 30 across the second cavity 22 or traversing the second cavity 22 with the wire section 30 and attaching a portion of the wire section 30 at the second holding feature 28 and possibly the first holding feature 26 as well. While the first and second holding features 26, 28 are shown here as a part of the mold 14, it is also possible to locate the features 26, 28 apart from the mold 14. After attaching the wire section 30 to one or more holding features 26, 28, the piston 40 can release the wire section 30 and can be retracted back into the pneumatic device 38 as is shown in FIG. 3(c). It is also possible that the wire placement device can be implemented as a moveable arm that can place wire sections into the mold 14 and can be driven from a first position to a second position.

Turning to FIG. 4, a cross section of the parison 12 is shown that incorporates the wire section 30. In this case, the wire section 30 has been fully enclosed within the outer surface 34 of the parison 12. In this case, the encased wire forms a rib 42 extending inwardly into the interior volume of the tank.

Figure 5:
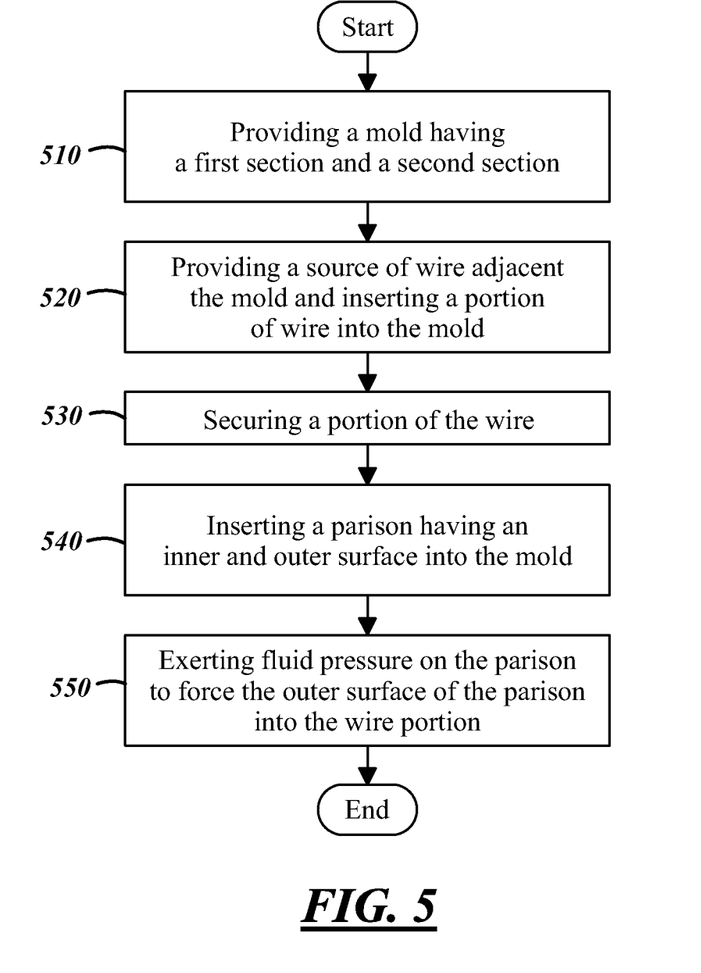
FIG. 5 is a flow chart of a method of forming a fuel tank.

With respect to FIG. 5, a method 500 of forming a receptacle, such as a fuel tank, is shown. FIGS. 1(a)-1(f) will also be referred to with regard to various elements. The method begins at step 510 by providing a mold having a first section 16 and a second section 18 that collectively define a cavity between them when closed together. In this way, each of the first section 16 and the second section 18 can include a portion of the cavity, the surface of which may at least partially define the shape of the fuel tank to be formed. Of course, it should be appreciated that this method 500 applies to other receptacles besides fuel tanks. However, for purposes of explanation, the method 500 will be described with respect to a fuel tank used in a vehicle fuel system. The fuel tank may be formed of a parison 12 made of any suitable material(s). In one form, the fuel tank may be formed from several layers of polymeric materials, in a so-called "multi-layer" fuel tank. The "multilayer" tank may include one or more structural layers which may form inner and outer layers of high-density polyethylene (HDPE) or the like, one or more adhesive layers and one of more barrier layers having a desired resistance to permeation therethrough of hydrocarbon or other vapors or liquids associated with the fluid contained within the fuel tank. Exemplary barrier layer materials include nylons and EVOH (ethylene vinyl alcohol), although others may be used. Alternatively, the tank could be formed from a single material, or could have layers in addition to or other than those specifically noted herein.

Generally speaking, the first and second mold sections 16, 18 can be separated or opened to receive a molten parison 12 within the cavity and then the first and second sections 16, 18 of the mold 14 can be joined together or closed. While closed, the cavity of the first and second mold sections 16, 18 can also include a blow pin and/or an opening for a blow pin, through which a fluid communicates with an inner surface 32 of the parison thereby exerting pressure on the parison 12 and forcing an outer surface 34 of the parison toward and into engagement with the cavity of the first and second sections 16, 18. The method 500 proceeds to step 520.

At step 520, a source of wire 24 is provided adjacent the mold 14 and a portion of wire 30 is inserted into the cavity of the mold 14. Before or as the parison 12 is inserted into the mold 14, one or more portions of wire 30 can be placed within the cavity of the mold 14 and can be located between the surface of the mold cavity and the molten parison 12. This wire 30 can have a flexibility and heat resistance capable of insertion into the blow mold 14, such as wire made of HDPE or other similar material. Wire 30 used with method 500 can have an exemplary diameter ranging from approximately 2 mm to 10 mm. Preferably, the wire 30 can have a diameter of 5 mm. In one example, the wire source 24 can store the wire 30 on a roll and rotate the roll of wire 30 such that wire 30 can be inserted into the cavity during the blow molding process. The roll can be rotated based on a computer-generated instruction that involves inserting a specific length or portion of wire 30 into the cavity of the mold 14. While method 500 is described with respect to one portion of wire 30, it is possible to use method 500 to insert a plurality of independent wire portions 30 into the cavity. And the plurality of independent wire portions 30 can be inserted into the cavity in such a way that the wire portions 30 are parallel to each other.

However, the independent wire portions 30 may also intersect each other at predetermined angles depending on how they are placed in the cavity of the mold. This will be discussed in more detail below. In another example, the predetermined angles between the wires 30 can be established by using dependent wire portions 30, such as can be created using a web or network of wire portions 30 in which a plurality of wire portions 30 have been joined to form a lattice of wire that has a predetermined width. The dependent wire portions 30, such as a web of wire, can be stored on the roll and the dependent wire portions 30 can be inserted into the cavity during the forming process much like the independent wire portions 30.

To insert more than one wire portion 30 in the mold cavity, more than one source of wire 24 can be used and each source 24 can produce a portion of wire 30 to be inserted in the cavity of the mold 14. It is possible that multiple independent wire portions 30 can be generated from multiple sources of wire 24. For instance, multiple sources of wire 24 can each include a continuous strand of wire from which a plurality of independent wire portions 30 can be cut. However, it is also envisioned that one source of wire 24 can supply a plurality of independent wire portions 30 into the cavity of the mold 14. In one form, an elongated tubular form or spool can include a plurality of continuous strands of wire each rolled around the spool. As the spool is rotated, a plurality of discrete independent wire portions 30 can be cut from the continuous strands of wire. Multiple wire sections can also be cut from a single wire and placed in different portions of the mold, as desired.

To insert wire portions into the mold 14, a wire placement device can be used that is adjacent the mold and the wire source. In one example, the wire placement device can be a pneumatic, hydraulic, servo-driven, or other device that uses a pushrod, piston, or arm having a gripping feature at one end for releasably holding a portion of the wire. An example of this device (e.g. wire placement device 38) was described above with respect to FIGS. 3(a)-(c). With respect to FIGS. 3(a)-(c), the pneumatic piston 40 can travel linearly—extending and retracting between a first position and a second position. And the gripping feature can be a mechanical clamp that is able to releasably grip a section of wire and such a clamp can be electrically, mechanically, hydraulically, and/or pneumatically actuated. Before inserting the wire portion 30 into the cavity of the mold 14, the gripping feature may connect or be connected to a section of the wire portion 30. The section of the wire portion 30 can be the end of the wire or some point along the length of the wire. After the gripping feature holds the wire, the piston 40 can extend across the cavity of the mold 14 thereby traversing the cavity of the mold 14 with the wire portion 30, a plurality of wire portions 30, or a web of wire portions 30.

It should be appreciated that the wire portion 30 can be inserted into the cavity of the mold 14 in a variety of ways. For example, the wire portion 30 can completely traverse the cavity of the mold 14. In another example, the wire portion 30 can be partially placed in the mold 14 in such a way that it does not traverse the entire cavity of the mold 14. In this case, the wire portion 30 could simply terminate somewhere within the mold cavity, may be one or more wire loops placed in the cavity of the mold 14 with ends optionally extending out of the mold 14, or a serpentine-like placement of wire within the cavity of the mold 14, as examples, without limitation as to the many possibilities of wire placement and arrangement. The method 500 proceeds to step 530.

At step 530, the portion of the wire inserted into the cavity may be secured. When the wire portion(s) 30 have been inserted into the cavity of the mold 14, the portion(s) can be secured at one or more places in the mold 14. And this can be accomplished in any one of a number of ways. For example, the first section 16 or the second section 18 of the mold can include holding features 26, 28 that can secure the wire portion 30 and prevent it from moving. The holding features 26, 28 can take the form of a V-shaped slot formed on one side of a section of the mold 14. Optionally, a second V-shaped slot can be formed on the opposite side of the section of the mold 14. For example, the first section 16 can include one V-shaped slot, two V-shaped slots, or more. However, it is possible that the wire portion(s) 30 can be affixed using one holding feature and appropriately tensioned using the wire source 24. It is also possible to direct the angle of the wire portion 30 with respect to the mold 14 and/or the fuel tank based on the angle of the holding feature 26, 28. For instance, if the wire portion 30 is intended to rest in the cavity of the mold 14 at a predetermined angle, the holding feature 26, 28, such as the V-shaped groove, can be inserted in the first and/or second sections 16, 18 of the mold 14 at the predetermined angle. Using the wire placement device 38 discussed above, the piston 40 can use the gripping feature located on the piston 40 to hold the wire portion 30 and extend the piston 40 until the gripping feature reaches a point adjacent to the V-shaped holding feature. The piston 40 can then move the wire portion 30 into a position where it is held by the V-shaped feature and the gripping feature can release the wire portion 30. The piston 40 can then retract. It is also possible to carry out the actions of the piston 40 using a robotic arm or other actuating device. And if a plurality of wire portions 30 is inserted into the mold 14, then a plurality of holding features 26, 28 can be used with the first and/or second mold sections 16, 18.

Apart from holding features 26, 28, it is possible to secure the wire portions 30 to the mold 14 in other ways. For instance, one or more portions of wire 30 can be inserted into the cavity of the mold 14. In this case, the wire portions 30 can fully traverse the cavity of the first and second sections 16, 18 of the mold 14. Then, the first and second sections 16, 18 of the mold 14 can be closed or brought together for the molding process in such as way that the first and second sections 16, 18 of the mold 14 pinch the wire portion(s) 30 between the first and second sections 16, 18 of the mold 14. In this case, a particular holding feature may not be necessary to secure the wire(s) in the cavity during the molding process.

The shape of the fuel tank can be at least partially defined based on the length of the wire portion(s) 30 inserted into the mold 14. That is, one or more portions of wire 30 can be used to exert a resistive force against the outside surface 34 of the parison 12 as the fuel tank is formed. In one example, it is possible to insert a wire portion 30 into the mold 14 having sufficient length that during fuel tank formation the wire portion 30 will be pressed substantially flush with the surface of the cavity. However, it is also possible to add contours or ribs to the fuel tank other than those included in the cavity of the mold. For example, the wire portion 30 can be inserted into the cavity having a length that is less than a length that would otherwise fit flush with the surface of the mold cavity. The length of the wire section 30 secured to the mold 14 can be varied depending on the depth of the rib that is desired in the fuel tank. That is, insert a greater portion of wire 30 into the cavity may cause a shorter rib height to be produced. On the other hand, decreasing the length of wire portion 30 in the mold 14 and a rib having a greater depth can be created. The method proceeds to step 540.

At step 540, a parison 12 having an inner and an outer surface 32, 34 is inserted into the cavity of the mold 14. Once the wire portion 30 is inserted into the cavity of the mold 14, the parison 12 can be inserted into the cavity of the mold 14 as well. Generally, the parison 12 can have a tubular cross-section, however it should be appreciated that this cross-sectional shape can vary. When inserted, the parison 12 can be placed proximate to the one or more wire portions 30 within the cavity. This can be described by one or more wire portions 30 facing the outer surface of the parison 12. When the wire portions 30 and the parison 12 have been inserted into the cavity of the mold 14, the first section 16 and the second section 18 can be brought together to close the mold 14 in preparation of forming the fuel tank. The method 500 proceeds to step 550.

At step 550, fluid pressure is exerted on the inner surface 32 of the parison to force the outer surface 34 of the parison against the portion(s) of the wire 30 so as to embed at least a portion of the wire 30 into the outer surface 34 of the parison 12 and shape a portion of the parison 12. The parison 12 can be deformed and the one or more wire portion(s) 30 can be at least partially embedded in the surface of the parison 12. During the blow molding process, fluid pressure, such as compressed air, can be used to force the parison 12 toward the cavity surface of the mold 14. Here, the fluid pressure can also force the wire portions 30 into the outer surface 34 of the parison 12. When this occurs, the outer surface 34 of the parison 12 and the wire portion(s) 30 are at least partially incorporated. This means that in some applications, at least part of the wire portion(s) 30 can remain and/or be visible outside of the surface of the parison 12, even after the parison 12 has been molded into the form of the fuel tank and has cooled. However, in some applications, it is possible that the fluid pressure exerted on the inside of the parison 12 can force the outside surface 34 of the parison 12 into the wire portions 30 in such a way that the wire portion(s) 30 can be fully integrated into the parison 12 such that the wire portion(s) 30 do not remain and/or is not visible outside of the parison outer surface 34.

Additionally, the blow molding process can also force the outside surface 34 of the parison 12 against the wire portion(s) 30 thereby creating ribs in the fuel tank. In this case, at least some part of the wire portion(s) 30 may not contact the surface of the mold cavity. As the outside surface 34 of the parison 12 is forced toward the surface of the cavity under pressure, the wire portions 30 can prevent at least a portion of the outside surface 34 of the parison 12 from reaching the surface of the mold cavity. That way, one or more ribs can be formed along the wire portion(s) 30. The method 500 then ends.

While the forms of the invention herein disclosed constitute presently preferred embodiments, many others are possible. For example, while the disclosure generally relates to placement of an elongated element between a mold and exterior surface of a parison, it also is possible to position the elongated element(s) between two parisons. In this form, the elongated element(s) would be outside of an inner parison and inside of an outer parison. It may also be possible to place an elongated element within or inside of a single parison, or the innermost parison if multiple parisons are used, if desired. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A method of forming a fuel tank, comprising the steps of:
 (a) providing a mold having at least two sections that collectively form a cavity for forming a fuel tank; with at least one section having spaced apart and generally opposed side portions of the cavity;
 (b) disposing one or more elongated elements across the spaced apart side portions of the cavity and within the cavity;
 (c) placing a parison in the cavity with the elongated elements outside of the parison; and
 (d) exerting fluid pressure on an inner surface of the parison thereby deforming the parison and engaging a portion of an outer surface of the parison with the elongated elements to embed at least a portion of the elongated elements with a the portion of the outer surface of the parison and to form the shape of the exterior of the fuel tank.

2. The method of claim 1, further comprising the step of providing one or more dependent wire portions for insertion within the cavity.

3. The method of claim 1, further comprising the step of providing one or more holding features located adjacent the cavity.

4. The method of claim 1, further comprising the step of creating one or more ribs in the parison by forcing the elongated elements into the surface of the parison.

5. The method of claim 1, further comprising the step of fully encapsulating the elongated elements within a surface of the parison.

6. The method of claim 1, further comprising the step of inserting the elongated elements into the cavity using a wire insertion device.

7. The method of claim 6, wherein the wire insertion device further comprises an arm driven from a first position to a second position to place an elongated element at least partially within the cavity.

8. A method of forming a fuel tank, comprising the steps of:
 (a) providing a mold having a first section and a second section that collectively define a cavity between them with at least one section having spaced apart and generally opposed side portions of the cavity;
 (b) providing a source adjacent the mold for delivering an elongated element;
 (c) disposing the elongated element across the spaced apart side portions of the cavity and into the cavity of the mold;
 (d) securing the elongated element in the cavity of the mold;
 (e) inserting a parison having an inner and an outer surface into the cavity of the mold with the elongated elements outside of the parison; and
 (f) exerting pressure on the inner surface of the parison to force the outer surface of the parison against the elongated element so as to engage at least a portion of the elongated element with the outer surface of the parison and shape a portion of the parison.

9. The method of claim 8, whereby the cavity includes a surface that at least partially shapes the parison.

10. The method of claim 8, further comprising the step of providing one or more dependent wire portions as the elongated element across and within the cavity.

11. The method of claim 8, further comprising the step of providing one or more holding features for securing the elongated element.

12. The method of claim 8, further comprising the step of creating one or more ribs in the parison by exerting pressure on the inner surface of the parison.

13. The method of claim 8, further comprising the step of fully encapsulating the elongated element within a surface of the parison.

14. The method of claim 8, further comprising the step of inserting the elongated element into the cavity using a wire insertion device.

15. The method of claim 14, wherein the wire insertion device further comprises an arm driven from a first position to a second position to place an elongated element at least partially within the cavity.

* * * * *

UNITED STATES PATENT AND TRADEMARK OFFICE
CERTIFICATE OF CORRECTION

PATENT NO. : 8,491,833 B2
APPLICATION NO. : 13/163211
DATED : July 23, 2013
INVENTOR(S) : Albert J. Boecker et al.

It is certified that error appears in the above-identified patent and that said Letters Patent is hereby corrected as shown below:

In the Claims

Column 8, Line 29, claim 1, delete "a".

Signed and Sealed this
Twenty-fourth Day of September, 2013

Teresa Stanek Rea
*Deputy Director of the United States Patent and Trademark Office*